(12) United States Patent  (10) Patent No.: US 8,219,297 B2
Inoue et al.  (45) Date of Patent: Jul. 10, 2012

(54) RUNNING CONTROL APPARATUS AND RUNNING CONTROL METHOD FOR VEHICLE

(75) Inventors: Gen Inoue, Susono (JP); Yasuhito Ishida, Toyokawa (JP)

(73) Assignees: Toyota Jidosha Kabushiki Kaisha, Toyota-shi (JP); Advics Co., Ltd., Kariya (JP)

( * ) Notice: Subject to any disclaimer, the term of this patent is extended or adjusted under 35 U.S.C. 154(b) by 0 days.

(21) Appl. No.: 13/368,083

(22) Filed: Feb. 7, 2012

(65) Prior Publication Data

US 2012/0143457 A1  Jun. 7, 2012

Related U.S. Application Data

(63) Continuation of application No. 12/023,540, filed on Jan. 31, 2008.

(30) Foreign Application Priority Data

Feb. 1, 2007  (JP) .................................. 2007-022790

(51) Int. Cl.
*B60K 28/10* (2006.01)
*G05D 13/02* (2006.01)
(52) U.S. Cl. ............................. 701/93; 180/170; 701/54
(58) Field of Classification Search .................... 701/93
See application file for complete search history.

(56) References Cited

U.S. PATENT DOCUMENTS

| 4,833,612 A | 5/1989 | Okuno et al. |
| 4,843,553 A | 6/1989 | Ohata |
| 5,245,542 A | 9/1993 | Itoh et al. |
| 5,253,624 A | 10/1993 | Anzai et al. |
| 5,844,342 A | 12/1998 | Miyatani et al. |
| 5,936,312 A | 8/1999 | Koide et al. |
| 6,166,499 A | 12/2000 | Kanamori et al. |
| 6,415,218 B2 | 7/2002 | Shimada et al. |
| 6,886,648 B1 | 5/2005 | Hata et al. |
| 7,050,898 B2 | 5/2006 | Ono et al. |
| 7,632,212 B2 | 12/2009 | Yamanaka et al. |

(Continued)

FOREIGN PATENT DOCUMENTS

JP  5-86927  4/1993

(Continued)

OTHER PUBLICATIONS

Office Action issued Feb. 15, 2011, in Japanese Patent Application No. 2007-022790, filed Feb. 1, 2007 (with English translation).

*Primary Examiner* — Shelley Chen

(74) *Attorney, Agent, or Firm* — Oblon, Spivak, McClelland, Maier & Neustadt, L.L.P.

(57) ABSTRACT

A running control apparatus for a vehicle includes a required driving output deciding unit that decides a required driving force of a driving system of the vehicle on the basis of an integrated value of a difference between a target vehicle speed and an actual vehicle speed, a driving control unit that controls the actuation of the driving system on the basis of the required driving force, and a determination unit that determines whether or not the required driving force is unrealizable in the control of the driving system due to the intervention of additional control. The required driving output deciding unit imposes a limit on an increase or a decrease in the required driving force when the determination unit determines that the required driving force is unrealizable in the control of the driving system.

18 Claims, 5 Drawing Sheets

U.S. PATENT DOCUMENTS

| | | |
|---|---|---|
| 2001/0025218 A1 | 9/2001 | Shimada et al. |
| 2002/0096936 A1 | 7/2002 | Ishida et al. |
| 2003/0074124 A1 | 4/2003 | Ono et al. |
| 2004/0162182 A1 | 8/2004 | Joe et al. |
| 2007/0298928 A1 | 12/2007 | Yamanaka et al. |
| 2008/0290618 A1 | 11/2008 | Yanaka et al. |

FOREIGN PATENT DOCUMENTS

| | | |
|---|---|---|
| JP | 9-123794 | 5/1997 |
| JP | 10-250410 | 9/1998 |
| JP | 2001-248477 | 9/2001 |
| JP | 2004-90679 | 3/2004 |
| JP | 2006-213294 | 8/2006 |

RUNNING CONTROL APPARATUS AND RUNNING CONTROL METHOD FOR VEHICLE

INCORPORATION BY REFERENCE

This application is a continuation of U.S. application Ser. No. 12/023,540, filed Jan. 31, 2008, which claims priority under 35 U.S.C. 119 to Japanese Patent Application No. 2007-022790, filed Feb. 1, 2007. The disclosures of U.S. application Ser. No. 12/023,540 and Japanese Patent Application No. 2007-022790, including the specification, drawings and abstract are incorporated herein by reference in there entirety.

BACKGROUND OF THE INVENTION

1. Field of the Invention

The invention relates to a running control apparatus and a running control method for a vehicle such as an automobile or the like. More specifically, the invention relates to a running control apparatus and a running control method for a vehicle that control a driving force of the vehicle or a driving torque of a driving system (an engine, a motor, or the like) such that a vehicle speed of the vehicle coincides with a target vehicle speed.

2. Description of the Related Art

In recent years, vehicles such as automobiles and the like have been mounted with "automatic running control apparatuses" for automatically controlling vehicle speed through, for example, "cruise control", "creep running control" (Japanese Patent Application Publication No. 2004-90679 (JP-A-2004-90679)), "downhill assist control" (Japanese Patent Application Publication No. 2006-213294 (JP-A-2006-213294)), and the like. When such an automatic running control apparatus is actuated, a target value of a vehicle speed (target vehicle speed) is first decided according to an arbitrary method, for example, through designation or selection of the vehicle speed by a driver or on the basis of a running state of a vehicle (or a maneuvering state of the driver) or the like. Then, a difference between the target vehicle speed and an actual value of the vehicle speed (actual vehicle speed) is transmitted as feedback to a control device (driving control device) for a driving system of the vehicle such as an engine, a motor, or the like, and a driving force or a driving torque is controlled such that the actual vehicle speed coincides with the target vehicle speed, namely, that the difference between the target vehicle speed and the actual vehicle speed is eliminated. According to automatic running control as described above, the driver is not required to adjust a depression amount of an accelerator pedal or a brake pedal for controlling the vehicle speed to a certain value or holding the vehicle speed constant. Therefore, the burden imposed on the driver in maneuvering the vehicle is drastically reduced. The aforementioned automatic running control apparatus can also be used in, for example, remotely operating the running of the vehicle.

In feedback control based on the difference between the target vehicle speed and the actual vehicle speed in the aforementioned automatic running control apparatus, a required driving force or a required driving torque is often decided using an integrated value (or an accumulated value) (over time) of the difference between the target vehicle speed and the actual vehicle speed to ensure good follow-up performance of the actual vehicle speed to the target vehicle speed. A driving force or a driving torque needed to achieve or maintain a certain vehicle speed varies depending on the running state of the vehicle. Therefore, in adjusting the driving force or the driving torque using a quantity proportional to the difference between the target vehicle speed and the actual vehicle speed, it is difficult to appropriately set a proportional coefficient thereof, namely, a feedback gain in feedback of the difference between the target vehicle speed and the actual vehicle speed (the responsiveness of the actual vehicle speed deteriorates when the gain is small, and the actual vehicle speed tends to overshoot when the gain is large). On the other hand, in adjusting the value of the driving force or the driving torque on the basis of the integrated value of the difference between the target vehicle speed and the actual vehicle speed, the adjustment amount of the driving force or the driving torque can be increased as the difference between the target vehicle speed and the actual vehicle speed increases, in comparison with the case of making the adjustment using the quantity proportional to the difference between the target vehicle speed and the actual vehicle speed. Even when the feedback gain is held small to prevent the occurrence of overshoot, the actual vehicle speed can be made to swiftly follow the target vehicle speed. The vehicle speed as a target value of control is a first-order lag of the driving force or the driving torque that is changed in control. Therefore, a delay in the response of the vehicle speed for a change in the driving force or the driving torque is compensated for by controlling the driving force or the driving torque on the basis of the integrated value of the difference between the target vehicle speed and the actual vehicle speed.

Incidentally, in an actual vehicle, various types of control (interrupt control) for controlling vehicle speed, driving force, or driving torque are performed in some cases during the actuation of an automatic running control apparatus as described above, interrupting the actuation or in preference to the actuation. For example, when the rotational speed of an engine becomes excessively high with respect to the rotational speeds of wheels and an automatic transmission is overheated while a driving torque is transmitted from the engine to each of the wheels via the automatic transmission, the automatic transmission sometimes performs in some cases control for reducing the rotational speed of the engine (stall control) or the like for a control device for the engine. In such cases, the adjustment of the driving torque for vehicle speed control by the automatic running control apparatus is not achieved. As a result, the actual vehicle speed deviates from the target vehicle speed.

In the control configuration of the aforementioned automatic running control apparatus, if the actual vehicle speed remains deviant from the target vehicle speed (of the automatic running control apparatus) during the performance of interrupt control, which is performed in preference to the control of the automatic running control apparatus, the integrated value of the difference between the target vehicle speed and the actual vehicle speed increases. In consequence, the adjustment amount of the driving force or the driving torque required of the driving system through feedback control by the automatic running control apparatus (the required driving force or the required driving torque) keeps increasing as well. In this situation, when vehicle speed control is resumed in response to the termination of interrupt control and the reestablishment of a state where the control by the automatic running control apparatus is effectively reflected, the driving system such as the engine or the like is actuated with the increased adjustment amount of the required driving force or the required driving torque. Thus, a sudden rise or fall in an actually generated driving force or an actually generated driving torque (the actual driving force or the actual driving torque) is caused. In some cases, as a result, the behavior of the vehicle is seriously disturbed, or a sudden rise or a stagnation in vehicle speed is caused. As a matter of course, it is also conceivable to stop the actuation of the automatic running control apparatus during the performance of interrupt control. In such a case, however, the response of the actual vehicle speed in returning to the target vehicle speed may be delayed when vehicle speed control by the automatic running control apparatus is resumed.

In the related art, however, as described above, there seems to be no proposal to control a vehicle speed in consideration of a case where interrupt control has been performed during the actuation of an automatic running control apparatus.

SUMMARY OF THE INVENTION

The invention provides an automatic running control apparatus that serves to make an actual vehicle speed coincident with a target vehicle speed or maintain the actual vehicle speed at the target vehicle speed, is configured on the assumption that the control performed by the automatic running control apparatus may not be reflected due to the actuation of an additional control apparatus, and is designed to curb an inconvenience resulting from an increase in (an absolute value of) an integrated value of a difference between a target vehicle speed and an actual vehicle speed during the actuation of the additional control apparatus. More specifically, the invention provides an automatic running control apparatus so configured as to suppress a sudden rise or a sudden fall in a driving force or a driving torque that is generated in a driving system of a vehicle upon the establishment of a state where the control by the automatic running control apparatus is reflected after interruptive actuation of an additional control apparatus.

In a first aspect of the invention, a running control apparatus for a vehicle includes a vehicle speed difference calculating unit that calculates a difference between a target vehicle speed and an actual vehicle speed, a required driving output deciding unit that decides a required driving force or a required driving torque of a driving system of the vehicle on the basis of an integrated value of the difference between the target vehicle speed and the actual vehicle speed such that the actual vehicle speed coincides with the target vehicle speed, a driving control unit that controls actuation of the driving system on the basis of the required driving force or the required driving torque, and a determination unit that determines whether or not the required driving force or the required driving torque is unrealizable in the control of the driving system due to the intervention of additional control. In this running control apparatus, the required driving output deciding unit imposes a limit on an increase or a decrease in the required driving force or the required driving torque when the determination unit determines that the required driving force or the required driving torque is unrealizable in the control of the driving system.

Running control to which the apparatus in the first aspect of the invention is applied may be an arbitrary type of automatic running control for automatically making the actual vehicle speed of the vehicle coincident with the target vehicle speed as described above, such as cruise control, creep running control, downhill assist control, or the like. It is appropriate for the target vehicle speed to be set according to various methods (a) through designation or selection by a driver of the vehicle, (b) on the basis of a drive maneuver amount of the driver of the vehicle, (c) on the basis of a gradient of a road surface on which the vehicle runs, or (d) in accordance with another arbitrary running state of the vehicle or another arbitrary running environment condition of the vehicle. It is appropriate for the control for controlling the actuation of the driving system through interruption of the functioning of running control in the first aspect of the invention to be, for example, stall control as mentioned above, idle speed control, traction control, vehicle behavior stabilization control (VSC), or the like.

As described already, (the absolute value of) the integrated value of the difference between the target vehicle speed and the actual vehicle speed increases when the target vehicle speed cannot be achieved due to the intervention of additional control during the performance of running control for making the actual vehicle speed coincident with the target vehicle speed. Thus, under normal circumstances, the absolute value of the required driving force or the required driving torque according to running control is supposed to greatly deviate from the actual driving force or the actual driving torque that is actually generated in the vehicle. Then, upon reestablishment of a state where the target vehicle speed can be achieved, the driving system is supposed to be controlled through running control to eliminate the difference between the bloated actual driving force or the bloated actual driving torque and the required driving force or the required driving torque. Such control constitutes a factor in disturbances of the behavior of the vehicle or the occurrence of a sudden rise or a stagnation in vehicle speed. However, according to the foregoing aspect of the invention, in a period in which the target vehicle speed cannot be achieved, (the absolute value of) the required driving force or the required driving torque is restrained from increasing by limiting the increase or the decrease in the required driving force or the required driving torque. Thus, the actual driving force or the actual driving torque is restrained from suddenly rising or falling upon reestablishment of the state where the target vehicle speed can be achieved. Besides, the actual vehicle speed can reach the target vehicle speed as swiftly as possible when vehicle speed control by the apparatus in the first aspect of the invention is resumed in response to the reestablishment of the state where the target vehicle speed can be achieved, by reflecting a tendency of changes in the difference between the target vehicle speed and the actual vehicle speed to a certain extent on the required driving force or the required driving torque through a method of limiting the increase or the decrease in the required driving force or the required driving torque instead of stopping running control itself.

It is appropriate for the limitation of the increase or the decrease in the required driving force or the required driving torque in the period in which the target vehicle speed according to running control in this aspect of the invention cannot be achieved to be carried out, as one aspect of implementation, such that the required driving force or the required driving torque is limited to prevent the difference between the actual driving force or the actual driving torque that is actually generated in the driving system and the required driving force or the required driving torque from deviating from "a predetermined limit range". According to this configuration, even when a situation in which the integrated value of the difference between the target vehicle speed and the actual vehicle speed can increase occurs after continuation of the period in which the target vehicle speed cannot be achieved, the value of the required driving force or the required driving torque is adjusted such that the difference between the required driving force or the required driving torque and the actual driving force or the actual driving torque is confined within the predetermined limit range. Then, the actual driving force or the actual driving torque is restrained from suddenly varying upon reestablishment of the state where the target vehicle speed can be achieved, namely, upon establishment of the state where the required driving force or the required driving torque is reflected in the driving system.

In the foregoing aspect of the invention, the width of "the predetermined limit range" be set such that the required driving force or the required driving torque can be shifted to a certain extent from the actual driving force or the actual driving torque in accordance with the integrated value of the difference between the target vehicle speed and the actual vehicle speed instead of being set substantially to 0 (i.e., instead of making moves of the required driving force or the required driving torque coincident with those of the actual driving force or the actual driving torque). Thus, the required driving force or the required driving torque at the time of resumption of the vehicle speed control of this aspect of the invention, which has been suspended through interrupt control, can be made close to a driving force or a driving torque that is originally supposed to be achieved in the vehicle speed control of this aspect of the invention. When the width of the predetermined limit range is too small, the actual driving force or the actual driving torque changes slowly at the time of reflection of the required driving force or the required driving torque, and the follow-up performance of the actual vehicle speed to the target vehicle speed may deteriorate. In the meantime, when the width of the predetermined limit range is too large, the actual driving force or the actual driving torque tends to change greatly at the time of reflection of the required driving force or the required driving torque. Accordingly, in an embodiment of the invention, it is appropriate for the width of the predetermined limit range to be experimentally or theoretically decided in advance such that the actual driving force or the actual driving torque does not suddenly rise or fall upon reestablishment of the state where the target vehicle speed can be achieved.

It is appropriate for the value of the required driving force or the required driving torque to be, at the time of reestablishment of the state where the required driving force or the required driving torque is at least reflected, within a predetermined limit range from the actual driving force or the actual driving torque at that time. Accordingly, as another aspect of limiting the increase or the decrease in the required driving force or the required driving torque, the required driving force or the required driving torque at the time when the determination unit determines that a change has been made from the state where the required driving force or the required driving torque cannot be realized in the driving system to the state where the required driving force or the required driving torque can be realized in the driving system may be limited such that the difference between the required driving force or the required driving torque and the actual driving force or the actual driving torque of the driving system at the time of the determination does not deviate from the predetermined limit range.

Furthermore, as still another aspect of implementation of the limitation of the increase or the decrease in the required driving force or the required driving torque in the period in which the target vehicle speed according to the aforementioned running control, while the determination unit determines that the state where the required driving force or the required driving torque cannot be realized in the driving system is established, the value of the required driving force or the required driving torque may be held at the required driving force or the required driving torque at the time of the determination. In a vehicle, as a rule, a driving force or a driving torque that is necessitated to equalize an actual vehicle speed with a target vehicle speed remains substantially unchanged as long as there is no substantial change in a running state of the vehicle. Accordingly, even in the case where the state where vehicle speed control is reflected is reestablished after temporary establishment of the state where vehicle speed control is not reflected, which results from the intervention of additional control, during the functioning of the running control according to this aspect of the invention, it is likely that the driving force or the driving torque that is needed for the control of the actual vehicle speed may in many cases be substantially equal to a value immediately before the intervention of the additional control, as long as there is no change in the setting of the target vehicle speed. Thus, as described above, it is appropriate to limit the change in the required driving force or the required driving torque by maintaining the value of the required driving force or the required driving torque as soon as it is determined that the required driving force or the required driving torque cannot be realized in the driving system, namely, by suspending the integration of the difference between the target vehicle speed and the actual vehicle speed, and to restore a state prior to the intervention of the additional control by ensuring that the maintained required driving force or the maintained required driving torque is reflected in the driving system when the state where the required driving force or the required driving torque can be realized in the driving system is reestablished. It is appropriate for the required driving force or the driving torque at the time of the intervention of the additional control to be stored and used as the value of the required driving force or the required driving torque when vehicle speed control is resumed after the termination of the additional control.

In the first aspect of the invention, in the case where the driving system of the vehicle is an engine, the required driving output deciding unit may include a unit that calculates a target throttle opening degree of the engine on the basis of a required driving force or a required driving torque, a unit that controls controlling a throttle opening degree of the engine to the target throttle opening degree, and a unit that detects the throttle opening degree of the engine, and control the throttle opening degree to output the required driving force or the required driving torque in the driving system. In this case, it is appropriate to determine whether or not the required driving force or the required driving torque is unrealizable in the control of the driving system, by comparing a detected value of the throttle opening degree with the target throttle opening degree and determining whether or not a difference between the detected value of the throttle opening degree and the target throttle opening degree is outside a predetermined reference range. When a significant difference is detected between the detected value of the throttle opening degree and the target throttle opening degree (when the difference is beyond the predetermined reference range), the state where the control according to this aspect of the invention is not reflected is likely to have been established. In this case, it is appropriate to determine that the required driving force or the required driving torque is unrealizable in the control of the driving system. As a matter of course, it is also appropriate to determine that the intervention of additional control has taken place by acquiring information from the additional control. However, according to the aforementioned method of determination, even if the control apparatus is not incorporated with a configuration for acquiring information from the additional control, it is possible to determine whether or not the required driving force or the required driving torque is unrealizable in the control of the driving system.

The first aspect of the invention curbs an inconvenience resulting from a phenomenon in which the control of the driving force or the driving torque for the driving system by the running control apparatus is temporarily suspended due to the intervention of the additional control during the actuation of the apparatus. Especially, owing to a progress made in the art of vehicle running control in recent years, in more cases than ever, a plurality of kinds of control are simultaneously performed in a single vehicle. In the case where the plurality of such kinds of control are simultaneously performed, the first aspect of the invention allows these kinds of control to function compatibly with one another, and is very useful in a vehicle endowed with a variety of control functions.

In the foregoing aspect of the invention, it should be noted that, as described already, the running control apparatus is configured such that the required driving force or the required driving torque is allowed to shift from the actual driving force or the actual driving torque within the predetermined limit range having the width substantially unequal to 0 even in the case of the establishment of the state where the requirement made by the apparatus of the invention is not reflected in the driving system. According to this configuration, at the time when vehicle speed control is resumed in response to the reestablishment of the state where the requirement made by the apparatus of this aspect of the invention is reflected in the driving system, the required driving force or the required driving torque is offset from the actual driving force or the actual driving torque at that time in a direction reflecting the tendency of changes in the difference between the target vehicle speed and the actual vehicle speed (close to the required driving force or the required driving torque that is given on the basis of the integrated value of the difference between the target vehicle speed and the actual vehicle speed). Thus, good follow-up performance of the actual vehicle speed to the target vehicle speed is ensured after the resumption of vehicle speed control. Furthermore, according to this configuration, even in the case where the actual driving force or the actual driving torque does not coincide with the required driving force or the required driving torque due to changes in the condition of a road surface, an environment in which the vehicle is used, an aged deterioration thereof, or the like in the driving system of the vehicle, good vehicle speed control can be resumed. Therefore, an advantage is gained. In the case where a command value for the required driving force or the required driving torque cannot be accurately or appropriately generated in the driving system, especially where the generated driving force or the generated driving torque is smaller than a required value thereof, if vehicle speed control according to this aspect of the invention is resumed with the required driving force or the required driving torque coincident with the actual driving force or the actual driving torque, the follow-up performance of the actual vehicle speed to the target vehicle speed deteriorates after the resumption of vehicle speed control. However, according to the aforementioned configuration, the required driving force or the required driving torque is offset from the actual driving force or the actual driving torque in the direction reflecting the tendency of the changes in the difference between the target vehicle speed and the actual vehicle speed. Therefore, the actual vehicle speed can be more swiftly made close to the target vehicle speed.

In a second aspect of the invention, a running control method for a vehicle includes calculating a difference between a target vehicle speed and an actual vehicle speed, deciding a required driving force or a required driving torque of a driving system of the vehicle on the basis of an integrated value of the difference between the target vehicle speed and the actual vehicle speed such that the actual vehicle speed coincides with the target vehicle speed, controlling actuation of the driving system on the basis of the required driving force or the required driving torque, determining whether or not the required driving force or the required driving torque is unrealizable in the control of the driving system due to intervention of additional control, and imposing a limit on an increase or a decrease in the required driving force or the required driving torque when it is determined that the required driving force or the required driving torque is unrealizable in the control of the driving system.

BRIEF DESCRIPTION OF THE DRAWINGS

The foregoing and further objects, features and advantages of the invention will become apparent from the following description of example embodiments with reference to the accompanying drawings, wherein like numerals are used to represent like elements:

FIGS. 2A and 2B show changes in driving torque and vehicle speed respectively in a case where the required driving torque is not limited during the functioning of interrupt control (related art). FIGS. 2C and 2D show changes in driving torque and vehicle speed respectively in a case where the required driving torque is limited during the functioning of interrupt control (this embodiment of the invention);

FIGS. 3A and 3B show changes in driving torque and vehicle speed respectively in a case where the required driving torque is not limited during the functioning of interrupt control (related art). FIGS. 3C and 3D show changes in driving torque and vehicle speed respectively in a case where the required driving torque is limited during the functioning of interrupt control (this embodiment of the invention);

FIGS. 4A to 4D are diagrams similar to FIGS. 2A to 2D respectively. These diagrams show examples of changes over time in required driving torque, actual driving torque, target vehicle speed, and actual vehicle speed in a case where interrupt control intervenes during the performance of vehicle speed control by the running control apparatus when the actual driving torque is not suitably generated for the required driving torque (when the actual driving torque is smaller than the required driving torque) in a driving system of a vehicle due to an environment in which the vehicle is used, an aged deterioration thereof, or the like. FIGS. 4A and 4B show changes in driving torque and vehicle speed respectively in a case where the required driving torque is made substantially coincident with the actual driving torque during the functioning of interrupt control. FIGS. 4C and 4D show changes in driving torque and vehicle speed respectively in a case where the required driving torque is variable within a predetermined limit range during the functioning of interrupt control.

DETAILED DESCRIPTION OF EMBODIMENT

Figure 1A:
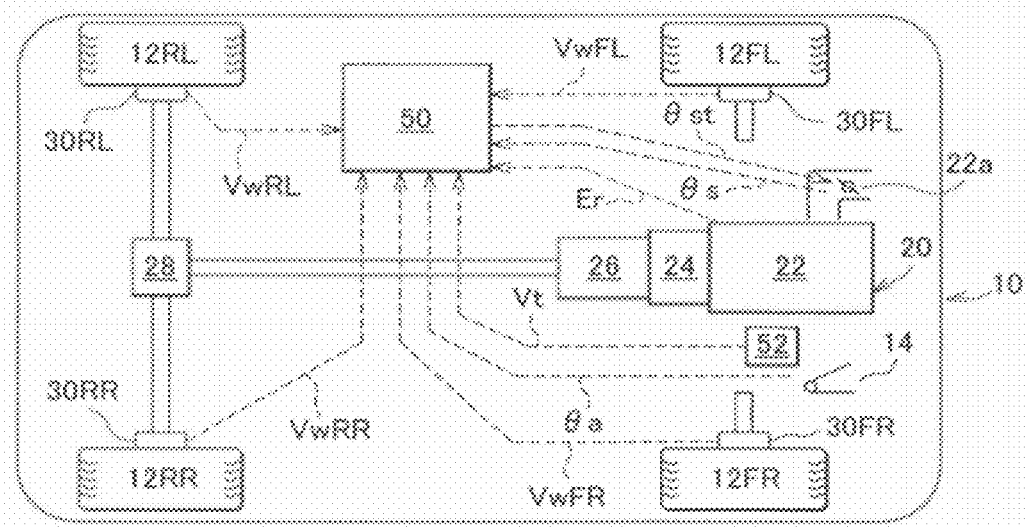
FIG. 1A shows a schematic diagram of an automobile incorporated with a running control apparatus as an embodiment of the invention.

The invention will be described hereinafter in detail with reference to the accompanying drawings as to an embodiment thereof. In the drawings, like reference symbols represent like parts.

(Configuration of Apparatus) FIG. 1A schematically shows an automobile mounted with a running control apparatus according to the embodiment of the invention. In FIG. 1A, a vehicle 10 having a front-left wheel 12FL, a front-right wheel 12FR, a rear-left wheel 12RL, and a rear-right wheel 12RR is mounted with a driving system 20 for generating a driving force for each of the wheels (only the rear wheels in an example illustrated in FIG. 1A because the vehicle 10 is a rear-wheel-drive vehicle) in accordance with depression of an accelerator pedal 14 by a driver in a normal mode. In the illustrated example, the driving system 20 is designed such that a driving torque or a rotational driving force that is output from an engine 22 via a torque converter 24, an automatic transmission 26, a differential gear mechanism 28, and the like is transmitted to each of the rear wheels 12RL and 12RR. The driving system 20 may be an electric driving system employing a motor instead of the engine 22, or a hybrid driving system having both an engine and a motor. Although not illustrated for the sake of simplicity, as is the case with normal vehicles, the vehicle 10 is provided with a braking device for generating a braking force for each of the wheels, and a steering gear for controlling the steering angle of the front wheels or the steering angles of the front wheels and the rear wheels. The braking device has a hydraulic circuit including an oil reservoir, an oil pump, various valves and the like, wheels cylinders fitted on the respective wheels, and a master cylinder that is actuated in response to depression of a brake pedal by the driver. Brake pressures in the respective wheel cylinders, namely, braking forces applied to the respective wheels are adjusted by the hydraulic circuit in response to a pressure in the master cylinder. However, the braking device may be designed to electromagnetically apply a braking force to each of the wheels, or be designed in other arbitrary forms known to those skilled in the art. The vehicle may be a front-wheel-drive vehicle or a four-wheel-drive vehicle.

The actuation of the driving system 20 is controlled by an electronic control unit 50. Respective means in the running control apparatus according to this embodiment of the invention are realized in the configuration and actuation of this electronic control unit 50. It is appropriate for the control performed by the running control apparatus according to this embodiment of the invention to be an arbitrary type of automatic running control for automatically making an actual vehicle speed of the vehicle coincident with a target vehicle speed, more specifically, such as cruise control, idle speed control, creep running control, downhill assist control, or the like. In the case where the driving system is controlled through additional interrupt control different from running control in this embodiment of the invention, for example, stall control, traction control, VSC, or the like, any one of these types of control is performed in preference to the running control according to this embodiment of the invention. The interrupt control may also be realized inside the electronic control unit 50. Alternatively, it is appropriate for the interrupt control to be performed in another electronic control device unit (not shown).

It is appropriate for the electronic control unit 50 to include a driving circuit and a normal-type microcomputer having a CPU, a ROM, a RAM, and an input/output port device that are coupled to one another by a bidirectional common bus. Detected values of a rotational speed Er of the engine, a throttle opening degree θs of a throttle valve 22a of the engine, an accelerator pedal depression amount θa, and the like are input to the electronic control unit 50 from sensors provided on respective portions of the vehicle. Detected values of wheel speeds Vwi are input to the electronic control unit 50 from wheel speed sensors 30i (i=FL, FR, RL, RR). In addition to the aforementioned detected values, it is appropriate for various detection signals for obtaining various parameters needed for various types of control to be performed in the vehicle of this embodiment of the invention to be input. As will be described below in detail, the electronic control unit 50 adjusts the opening degree of the throttle 22a of the engine 22 on the basis of a series of aforementioned pieces of information such that the required driving torque is achieved when the actual vehicle speed of the vehicle coincides with the target vehicle speed. It is appropriate for the target vehicle speed to be set by a speed setter 52 installed at a position accessible by the driver of the vehicle (e.g., on a steering wheel, a front panel, or the like).

Figure 1B:
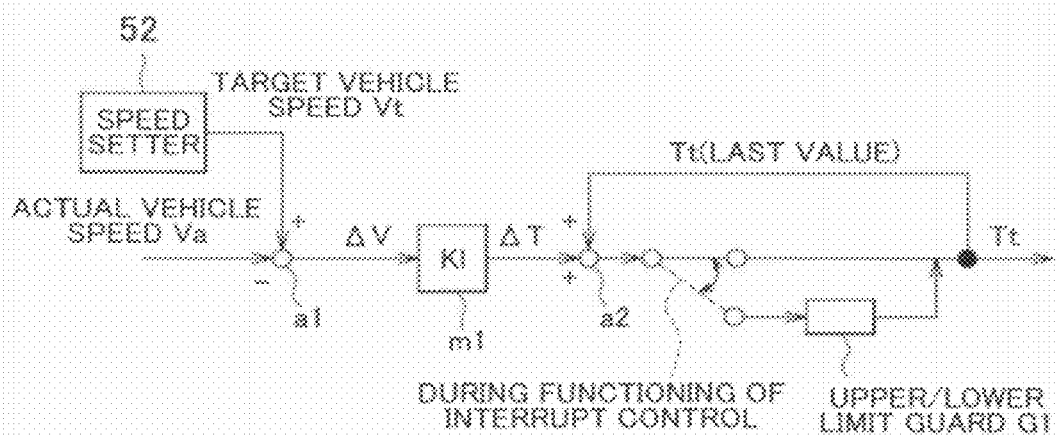
FIG. 1B represents, in the form of a control block diagram, a control processing in decision of a required driving torque by the running control apparatus.

FIG. 1B shows, in the form of a control block, the configuration of a control processing for deciding a required driving torque from a target vehicle speed and an actual vehicle speed in the electronic control unit 50 for vehicle speed control. It should be understood in FIG. 1B that a driving output command value of the driving system is calculated in units of driving torque but may also be calculated in units of driving force generated in each of the driving wheels of the vehicle.

Referring to FIG. 1B, the control configuration according to this embodiment of the invention includes, as is the case with the configuration of normal vehicle speed control and as shown in FIG. 1B, the configuration of feedback control in which a difference $\Delta V = Vt - Va$ between a target vehicle speed Vt given by the speed setter 52 and an actual vehicle speed Va estimated from wheel speeds or the like is calculated (an adder a1, vehicle speed difference calculating means), the difference $\Delta V$ is serially integrated to eliminate the difference $\Delta V$, and a required driving torque Tt to be output in the driving system is calculated. It is appropriate for the required driving torque Tt to be given according to, for example, $Tt = \Delta T + Tt$ (last value) ... (1) (an adder a2). It should be noted herein that $\Delta T$ is a torque change amount obtained using a map (not shown) having the current vehicle speed difference $\Delta V$ as a variable. Typically, this torque change amount is a quantity given in the form of $\Delta T = K_1 \cdot \Delta V$ ... (2) (a multiplier m1). $K_1$ is a feedback gain. This feedback gain may be a constant, but may be given by a map having the vehicle speed difference $\Delta V$ as a variable. Further, Tt (last value) is a required driving torque already obtained up to now, namely, an integrated value of the $\Delta T$ integrated so far. Thus, according to the required driving torque in an expression (1), in the case where the actual vehicle speed Vt is different from the target vehicle speed Va when the target vehicle speed Va is given as a certain value, a change in Tt is caused, and the vehicle is accelerated/decelerated until the actual vehicle speed Vt coincides with the target vehicle speed Va. Then, when the actual vehicle speed Vt coincides with the target vehicle speed Va, the driving torque resulting from the integrated value of $\Delta T$ corresponding to the vehicle speed difference $\Delta V$ obtained so far counterbalances a force for accelerating/decelerating the vehicle, for example, a gradient of a road surface or a running resistance to maintain the vehicle speed.

The required driving torque Tt thus calculated is then used to calculate a target throttle opening degree Ost of the driving system. However, as will be described later, in the case where interrupt control performed in preference to the control by the apparatus according to this embodiment of the invention intervenes in controlling the engine, the required driving torque Tt is not directly used as a control command value for the engine. Instead, the required driving torque is subjected to an upper/lower limit guard G1 that is set by referring to an actual driving torque Ta actually generated in the engine. Hence, the value of the required driving torque Tt is limited. Even in the case where the control according to this embodiment of the invention is realized in the driving system, it is appropriate to perform a processing such as an upper/lower limit guard for limiting a maximum value or a minimum value of the required driving torque Tt, a change amount guard for limiting a maximum value or a minimum value of the change in the required driving torque Tt, or the like, for the sake of operational safety or protection of the driving system or the vehicle.

In the upper/lower limit guard G1 for limiting the value of the required driving torque that is used to calculate the target throttle opening degree Ost of the driving system during the performance of interrupt control, the value of the required driving torque is limited to a range defined by $Ta-Tlg \leq Tt \leq Ta+Tug$ ... (3). It should be noted herein that Tlg and Tug are a lower limit and an upper limit of the required driving torque respectively, which are measured from the actual driving torque Ta. That is, during the performance of interrupt control, the required driving torque Tt is allowed to be variable only within a predetermined limit range having the actual driving torque Ta as a criterion. In this case, as understood from FIG. 1B, the integration of $\Delta T$ with the required driving torque in the expression (1) is also carried out using the required driving torque limited to the range of an expression (3) as Tt (last value). Thus, as long as the value of the required driving torque calculated in the expression (1) is limited to the range of the expression (3) measured from the actual driving torque, the value of the current vehicle speed difference $\Delta V$ is reflected. Even in the case where the value of the required driving torque in the expression (1) exceeds the value in the expression (3), the required driving torque is set to an upper limit or a lower limit that corresponds to the sign of the integrated value of the vehicle speed difference $\Delta V$ (i.e., the integrated value of $\Delta T$). Then, after the termination of interrupt control, vehicle speed control according to this embodiment of the invention is resumed using the required driving torque that reflects, to a certain extent, a tendency of the vehicle speed difference $\Delta V$ demonstrated so far.

Although not shown, a feedforward control portion is usually provided in addition to the aforementioned configuration of feedback control. In the feedforward control portion, a feedforward component $T_{FF}$ of the required driving torque is calculated. In the case where, for example, the road surface on which the vehicle runs has a gradient, the feedforward component $T_{FF}$ of the required driving torque increases/reduces the required driving torque in accordance with the gradient of the road surface. In the case where this feedforward control is used as well, with the required driving torque resulting from feedback control that is given as the integrated value of $\Delta V$ (the integrated value of $\Delta T$) expressed as a feedback component $T_{FB}$, a total required driving torque Tt is given according to $Tt = T_{FB} + T_{FF}$ ... (4). In integrating the vehicle speed difference $\Delta V$, the feedforward component $T_{FF}$ needs to be removed. In consequence, therefore, the required driving torque is given according to $Tt = \Delta T + Tt$ (last value) $- T_{FF}$ (last value) $+ T_{FF}$ ... (5). During the performance of interrupt control, Tt is limited to the range of the expression (3) by the same token. A value limited to the range of the expression (3) is used as Tt (last value).

(Actuation of Apparatus) FIGS. 2A to 4D show examples of changes over time in required driving torque (dotted lines), actual driving torque (solid line), target vehicle speed (dotted lines), and actual vehicle speed (solid line) in a case where additional interrupt control intervenes during the actuation of the running control apparatus according to this embodiment of the invention. For comparison, an exemplary case of the running control apparatus in the related art is also illustrated.

Figure 2A:
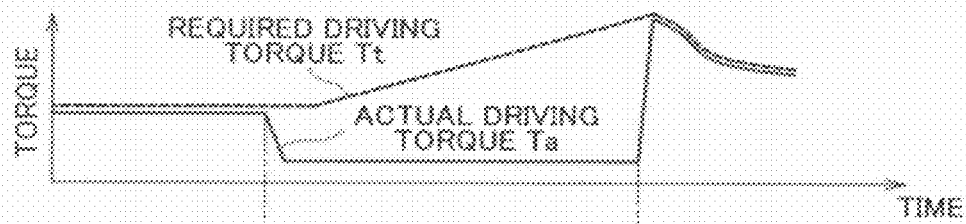
FIGS. 2A to 2D are diagrams exemplifying changes over time in required driving torque (dotted lines), actual driving torque (solid line), target vehicle speed (dotted lines), and actual vehicle speed (solid line) in a case where interrupt control intervenes during the performance of vehicle speed control by the running control apparatus, each showing a case where the actual vehicle speed is lower than the target vehicle speed.
Figure 2B:
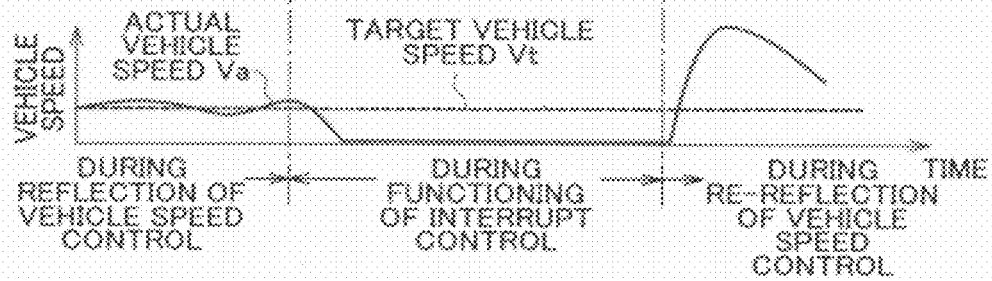
Figure 2C:
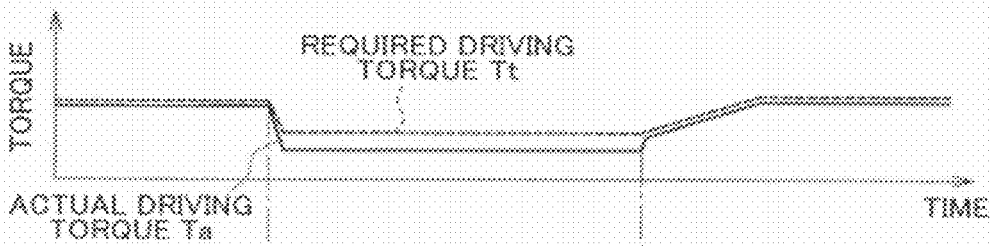
Figure 2D:
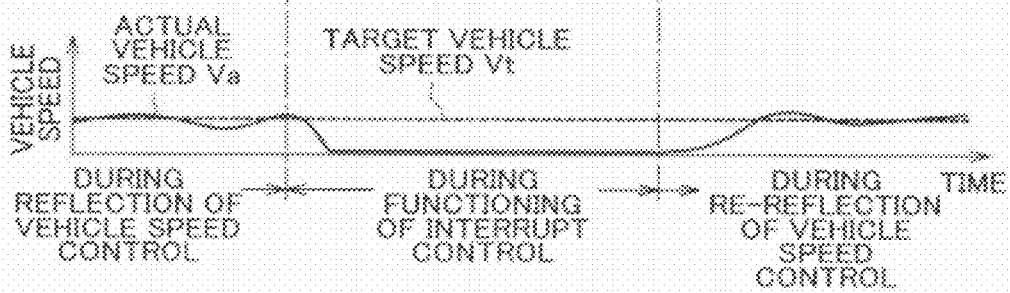

Reference will be made first to FIGS. 2A to 2D. In the case where the required driving torque is not limited during the functioning of interrupt control (related art) as shown in FIGS. 2A and 2B when the actual vehicle speed is lower than the target vehicle speed due to interrupt control, the actual driving torque suddenly increases (FIG. 2A) after the resumption of vehicle speed control, and the actual vehicle speed becomes much higher than the target vehicle speed in response thereto (FIG. 2B). On the other hand, in the case where the required driving torque is limited during the functioning of interrupt control (this embodiment of the invention) as shown in FIGS. 2C and 2D, the required driving torque during the functioning of interrupt control is allowed to change to a value larger than the actual driving torque by Tug (FIG. 2C). In this case, the actual vehicle speed swiftly follows the target vehicle speed after the resumption of vehicle speed control (FIG. 2D).

Figure 3A:
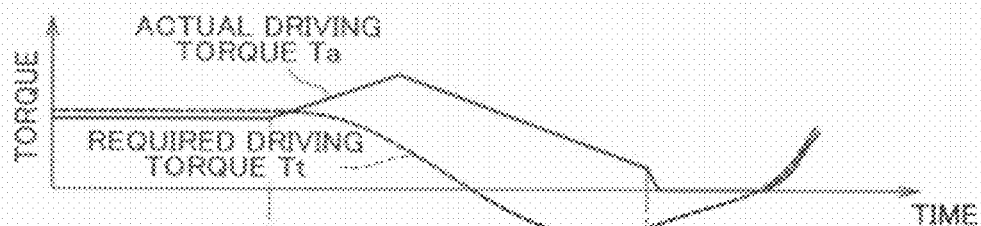
FIGS. 3A to 3D are diagrams similar to FIGS. 2A to 2D respectively. These diagrams exemplify changes over time in required driving torque, actual driving torque, target vehicle speed, and actual vehicle speed in a case where interrupt control intervenes during the performance of vehicle speed control by the running control apparatus, each showing a case where the actual vehicle speed is higher than the target vehicle speed.
Figure 3B:
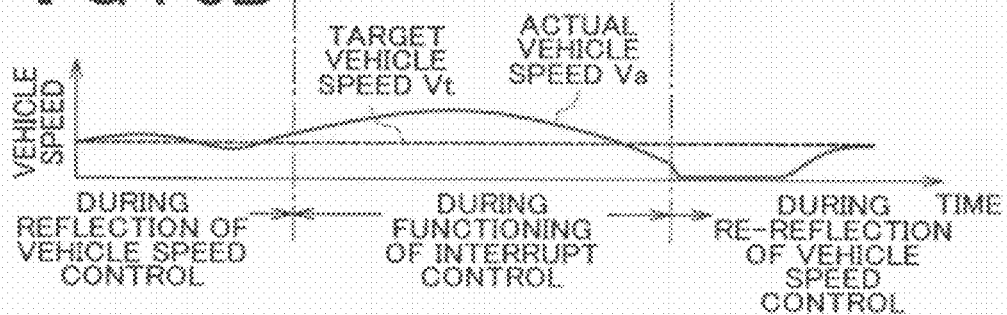
Figure 3C:
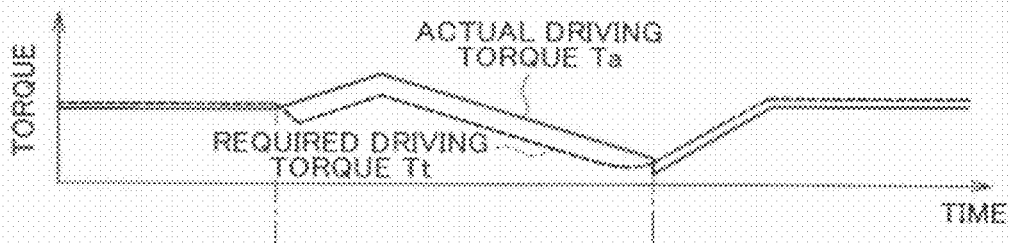
Figure 3D:
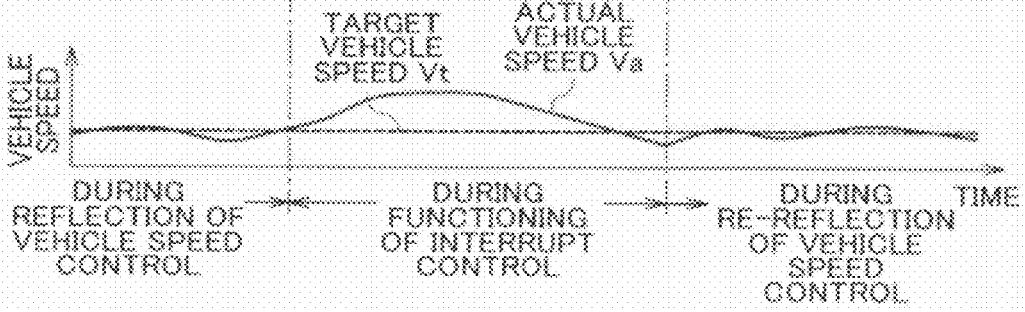

Reference will be made next to FIGS. 3A to 3D. In the case where the required driving torque is not limited during the functioning of interrupt control (related art) as shown in FIGS. 3A and 3B when the actual vehicle speed is higher than the target vehicle speed due to interrupt control, the required driving torque drastically decreases during the functioning of interrupt control. Therefore, the actual driving torque is substantially 0 until the required driving torque becomes positive after the resumption of vehicle speed control. As a result, a stagnation in vehicle speed is caused. On the other hand, in the case where the required driving torque is limited during the functioning of interrupt control (this embodiment of the invention) as shown in FIGS. 3C and 3D, the required driving torque during the functioning of interrupt control is allowed to change to a value smaller than the actual driving torque by Tlg (FIG. 3C). In this case, the actual vehicle speed swiftly follows the target vehicle speed after the resumption of vehicle speed control (FIG. 3D).

As described above, even in the case where the running control apparatus in the related art, namely, additional interrupt control intervenes, when the required driving torque Tt is not limited according to the expression (3), the actual vehicle speed Va diverges from the target vehicle speed Vt to continue a state of $\Delta V \neq 0$ during the functioning of interrupt control as shown in FIG. 2B or FIG. 3B, and the required driving torque Tt continues to rise (FIG. 2A) or fall (FIG. 3A). After that, when vehicle speed control by the running control apparatus is resumed in response to the termination of interrupt control, the actual driving torque Ta suddenly increases (FIG. 2A) or falls (FIG. 3A) to achieve the required driving torque Tt at that time. In consequence, the vehicle speed increases (FIG. 2B) or stagnates (FIG. 3B).

On the other hand, as described above, in the case where the required driving torque Tt is limited to the range of the expression (3) by the upper/lower limit guard during the functioning of interrupt control, even when $\Delta T$ is added in the expression (1) or (5), the required driving torque Tt changes substantially along the actual driving torque Ta, as shown in FIG. 2C or FIG. 3C. Accordingly, when vehicle speed control by the running control apparatus is resumed in response to the termination of interrupt control, sudden variations in the actual driving torque are suppressed. As a result, the actual vehicle speed swiftly follows the target vehicle speed (FIG. 2D or FIG. 3D).

As described already, when the required driving torque Tt is set variable in the direction in which the integrated value of ΔT is reflected instead of being made completely coincident with the actual driving torque Ta during the functioning of interrupt control, the actual vehicle speed can be made to more swiftly follow the target vehicle speed even in the case where the required driving torque Tt cannot be generated in the driving system due to an environment in which the vehicle is used, an aged deterioration thereof, or the like.

Figure 4A:
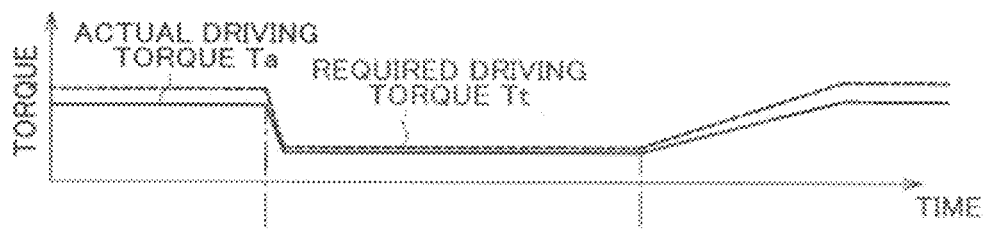
Figure 4B:
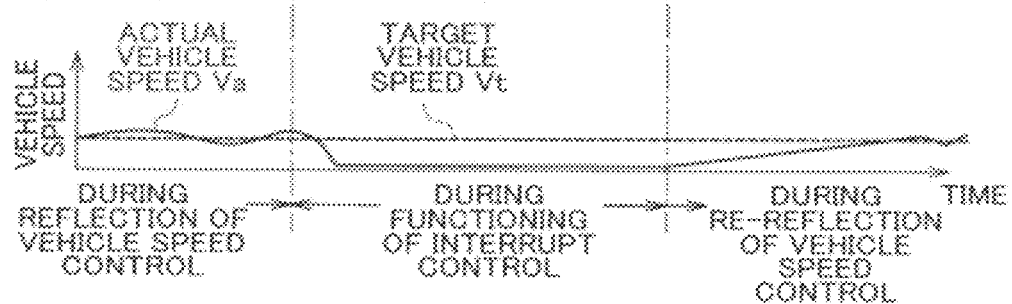
Figure 4C:
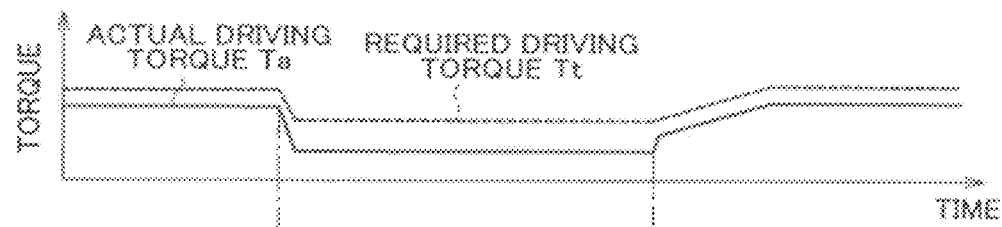
Figure 4D:
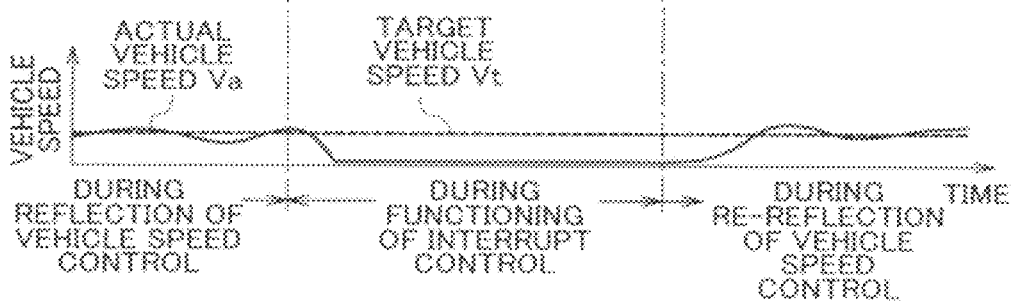

FIGS. 4A to 4D show the aforementioned circumstances. FIGS. 4A and 4B show changes in driving torque and vehicle speed respectively in the case where the required driving torque is made substantially coincident with the actual driving torque during the functioning of interrupt control. FIGS. 4C and 4D show changes in driving torque and vehicle speed respectively in the case where the required driving torque is variable within a predetermined limit range during the functioning of interrupt control. As understood from FIGS. 4A to 4D, when vehicle speed control is resumed, the required driving torque starts rising from the actual driving torque at that time in accordance with the vehicle speed difference in the case of FIG. 4A, but rises from a value larger than the actual driving torque at that time by Tug in accordance with the vehicle speed difference in the case of FIG. 4C. That is, in the case where the required driving torque Tt is made completely coincident with the actual driving torque Ta during the functioning of interrupt control, when vehicle speed control by the running control apparatus is resumed, variations in the required driving torque occur after the integration of ΔT has been awaited. Accordingly, changes in vehicle speed are delayed (FIGS. 4A and 4B). Meanwhile, if the required driving torque Tt is shifted from the actual driving torque Ta in the direction in which the integrated value of ΔT is reflected, vehicle speed control is resumed with a larger required driving torque at the time of the termination of interrupt control (FIGS. 4C and 4D).

Figure 5:
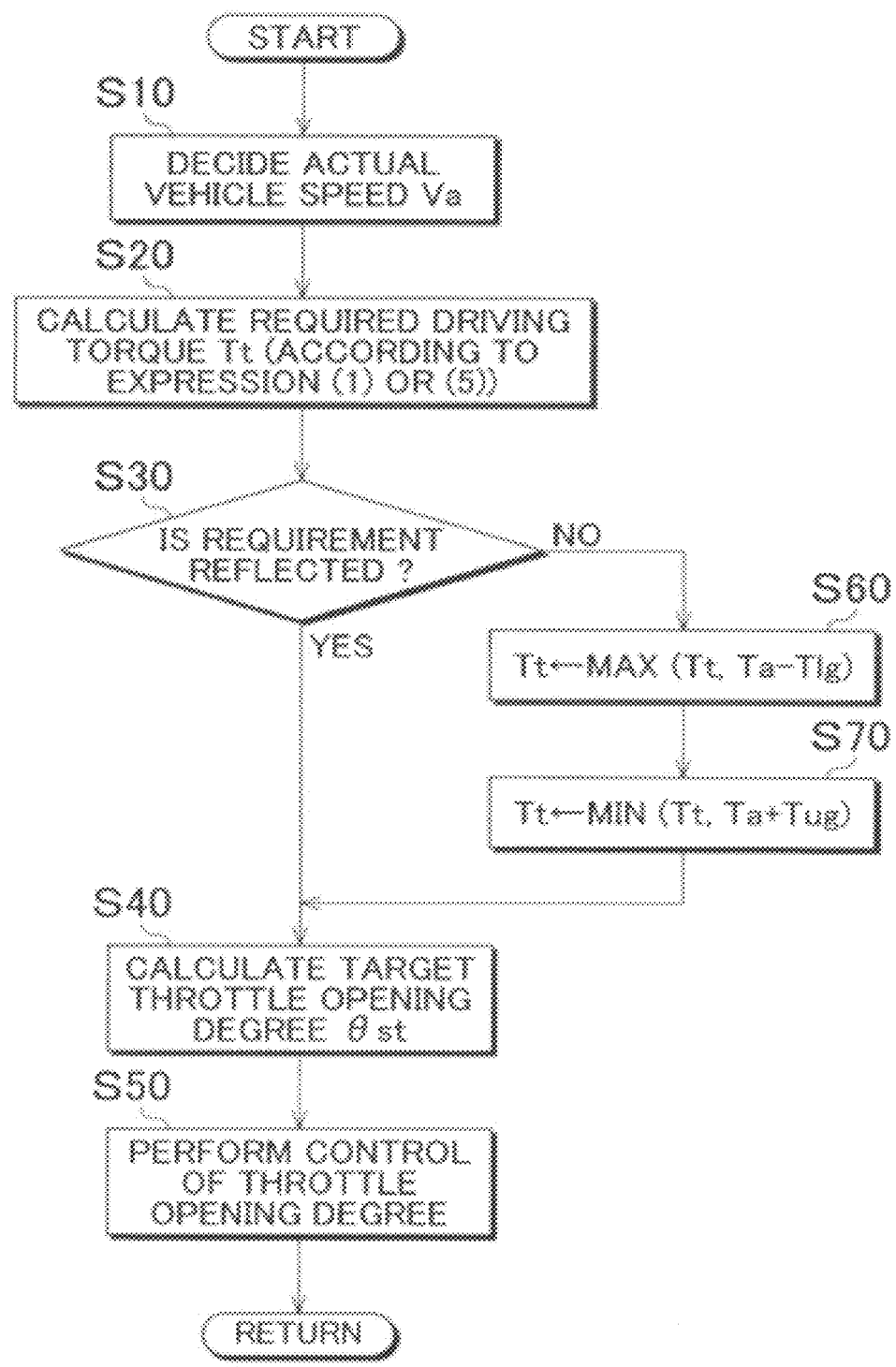
FIG. 5 represents, in the form of a flowchart, a control processing of the driving control device according to the embodiment of the invention.

FIG. 5 represents, as a flowchart, the flow of a processing process in the electronic control unit 50 for realizing running control according to this embodiment of the invention. The control processing of FIG. 5 is repeatedly performed at intervals in the order of millisecond when automatic control of vehicle speed is requested through an input made by the driver (e.g., by turning an actuating switch ON).

Referring to FIG. 5, when the cycle of control is started, the current actual vehicle speed Va is first detected or estimated. It is appropriate for the actual vehicle speed Va to be decided on the basis of data on the wheel speeds Vwi from the wheel speed sensors provided on the respective wheels according to an arbitrary method (e.g., as an average of the wheel speeds of all the wheels, the driving wheels, or driven wheels or the like) (step 10). After that, the required driving torque Tt is calculated according to the expressions (1) and (2) or the expressions (5) and (2) (step 20).

It is then determined whether or not interrupt control, which is performed in preference to vehicle speed control as running control according to this embodiment of the invention, is functioning, namely, whether or not a requirement for vehicle speed control is reflected (step 30). This determination may be made by receiving a signal indicating information on whether or not the control of the driving system is performed by an interrupt control. However, as will be described later, this determination may be made by referring to the state of the throttle opening degree. When it is determined in the determination of step 30 that the requirement for vehicle speed control is reflected, the required driving torque Tt calculated in step 20 is converted into a target throttle opening degree according to an arbitrary method known to those skilled in the art (step 40). The target throttle opening degree is transmitted to a control device (a throttle opening degree actuator (not shown)) of the driving system or the like (step 50).

On the other hand, when it is determined in the determination of step 30 that the requirement for vehicle speed control is not reflected, the value of the required driving torque Tt is limited to the range defined by the aforementioned expression (3). It is appropriate for this processing to be performed through, for example, a substitution processing of (step 60) Tt←MAX (Tt, Ta−Tlg) . . . (6a) (step 70) Tt←MIN (Tt, Ta+Tug) . . . (6b) (it should be noted herein that MAX represents the selection of a maximum value and that MIN represents the selection of a minimum value). It is appropriate for the actual driving torque Ta generated in the engine to be estimated using, for example, a map having a current throttle opening degree, an engine rotational speed, or the like as a variable. It is appropriate for the upper limit Tug and the lower limit Tlg to be experimentally or theoretically decided such that a sudden rise or fall in the actual driving force or the actual driving torque does not occur in resuming vehicle speed control.

Thus, when the required driving torque Tt, which is restrained from varying, is calculated, a conversion of the required driving torque Tt into the target throttle opening degree is made (step 40), and the target throttle opening degree is transmitted to the control device of the driving system as a command value (step 50). As described already, the required driving torque Tt, which has undergone step 60 and step 70, is utilized as a last value in step 20 of a subsequent control cycle. As understood from the foregoing description, when the requirement for the control of the driving system by the running control apparatus of the invention is reflected after the termination of interrupt control, the required driving torque, which has undergone step 60 and step 70 in a previous cycle and has been obtained by adding ΔT to the required driving torque as a value in the neighborhood of the actual driving torque Ta, is output to the driving system. As a result, sudden variations in torque are avoided in the driving system.

(Determination on Requirement Reflecting State) As described already, it is appropriate for the determination on whether or not the requirement for vehicle speed control is reflected in step 30 of the flowchart of FIG. 5 to be made depending on whether or not the detected value θs of the throttle opening degree substantially coincides with the target throttle opening degree θst calculated in step 40 of the flowchart of FIG. 5. For example, when there is established a relationship |θs−θst|>Δθs . . . (7) (it should be noted herein that Δθs is a positive, very small constant) as to the absolute value of the difference between the detected value of the throttle opening degree and the target throttle opening degree, there is a significant difference between the detected value θs of the throttle opening degree and the target throttle opening degree θst, and the control of the driving system for vehicle speed control according to this embodiment of the invention is not reflected owing to interrupt control. In other words, it is appropriate to determine that there is not established a state of "requirement reflected". According to this method, it is possible to find out whether or not running control according to this embodiment of the invention is reflected, without using a configuration for acquiring from interrupt control information on the state of the functioning thereof.

The invention has been described above in detail as to the specific embodiment thereof. However, it would be obvious to those skilled in the art that the invention is not limited to the foregoing embodiment thereof and that a variety of other embodiments are possible within the scope of the invention.

For example, in respect of the limitation of the value of the required driving torque Tt during the functioning of interrupt control, it is appropriate for the required driving torque Tt to be limited, as described already. For example, the execution of step 60 and step 70 may be allowed only in a cycle in which it is determined in step 30 of FIG. 5 that temporarily functioning interrupt control has been terminated. During interrupt control, the required driving torque Tt is not reflected and hence may be an arbitrary value. For example, from the beginning of the functioning of interrupt control to the termination thereof, the addition of $\Delta T$ according to the expression (1) or (5) may be suspended to thereby maintain the value of the required driving torque. In this case, after the termination of the functioning of interrupt control, the control of the driving system is resumed in a state prior to the beginning thereof.

Although vehicle speed control through the control of the driving system is described in the description of the foregoing embodiment of the invention, it should be understood that the control apparatus may be automatically actuated in an appropriate manner when the vehicle speed exceeds the target vehicle speed.

What is claimed is:

1. A running control apparatus for a vehicle, comprising:
   a vehicle speed difference calculating unit that calculates a difference between a target vehicle speed and an actual vehicle speed;
   a required driving output deciding unit that decides a required driving force or a required driving torque of a driving system of the vehicle on a basis of an integrated value of the difference between the target vehicle speed and the actual vehicle speed such that the actual vehicle speed coincides with the target vehicle speed;
   a driving control unit that controls actuation of the driving system on a basis of the required driving force or the required driving torque; and
   a determination unit that determines whether or not the required driving force or the required driving torque is unrealizable in the control of the driving system due to intervention of additional control, wherein the required driving output deciding unit imposes a limit on an increase or a decrease in the required driving force or the required driving torque when the determination unit determines that the required driving force or the required driving torque is unrealizable in the control of the driving system,
      wherein a value of the required driving force or the required driving torque is maintained, while the determination unit determines that the required driving force or the required driving torque is unrealizable in the control of the driving system, at a value of the required driving force or the required driving torque at a time when it is determined that the required driving force or the required driving torque is unrealizable in the control of the driving system.

2. The running control apparatus according to claim 1, wherein the required driving force or the required driving torque is limited such that a value of the required driving force or the required driving torque becomes closer to an actual driving force or an actual driving torque of the driving system than to a value of the required driving force or the required driving torque that is decided on a basis of an integrated value of the difference between the target vehicle speed and the actual vehicle speed, in a case where the required driving output deciding unit imposes the limit on the increase or the decrease in the required driving force or the required driving torque when it is determined that the required driving force or the required driving torque is unrealizable in the control of the driving system.

3. The running control apparatus according to claim 1, wherein the driving system of the vehicle is an engine,
   the required driving output deciding unit includes a unit that calculates a target throttle opening degree of the engine on a basis of the required driving force or the required driving torque, a unit that controls a throttle opening degree of the engine to the target throttle opening degree, and a unit that detects the throttle opening degree of the engine, and
   the determination unit determines that the required driving force or the required driving torque is unrealizable in the control of the driving system, when a difference between a detected value of the throttle opening degree and the target throttle opening degree is outside a predetermined reference range.

4. The running control apparatus according to claim 1, wherein the target vehicle speed is set by a driver of the vehicle.

5. The running control apparatus according to claim 1, wherein the target vehicle speed is set on a basis of a drive maneuver amount of a driver of the vehicle.

6. The running control apparatus according to claim 1, wherein the target vehicle speed is set on a basis of a gradient of a road surface on which the vehicle runs.

7. A running control apparatus for a vehicle, comprising:
   a vehicle speed difference calculating unit that calculates a difference between a target vehicle speed and an actual vehicle speed;
   a required driving output deciding unit that decides a required driving force or a required driving torque of a driving system of the vehicle on a basis of an integrated value of the difference between the target vehicle speed and the actual vehicle speed such that the actual vehicle speed coincides with the target vehicle speed;
   a driving control unit that controls actuation of the driving system on a basis of the required driving force or the required driving torque; and
   a determination unit that determines whether or not the required driving force or the required driving torque is unrealizable in the control of the driving system due to intervention of additional control, wherein the required driving output deciding unit imposes a limit on an increase or a decrease in the required driving force or the required driving torque when the determination unit determines that the required driving force or the required driving torque is unrealizable in the control of the driving system,
      wherein a value of the required driving force or the required driving torque is limited such that a difference between the required driving force or the required driving torque and an actual driving force or an actual driving torque of the driving system at a time, when it is determined that a state of the required driving force or the required driving torque changes from a state that the required driving force or the required driving torque is unrealizable in the control of the driving system into a state that the required driving force or the required driving torque is realizable in the driving system, does not deviate from a predetermined limit range.

8. The running control apparatus according to claim 7, wherein the required driving force or the required driving torque is limited such that a value of the required driving force or the required driving torque becomes closer to an actual driving force or an actual driving torque of the driving system than to a value of the required driving force or the required driving torque that is decided on a basis of an integrated value of the difference between the target vehicle speed and the actual vehicle speed, in a case where the required driving output deciding unit imposes the limit on the increase or the decrease in the required driving force or the required driving torque when it is determined that the required driving force or the required driving torque is unrealizable in the control of the driving system.

9. The running control apparatus according to claim 7, wherein the driving system of the vehicle is an engine,
the required driving output deciding unit includes a unit that calculates a target throttle opening degree of the engine on a basis of the required driving force or the required driving torque, a unit that controls a throttle opening degree of the engine to the target throttle opening degree, and a unit that detects the throttle opening degree of the engine, and
the determination unit determines that the required driving force or the required driving torque is unrealizable in the control of the driving system, when a difference between a detected value of the throttle opening degree and the target throttle opening degree is outside a predetermined reference range.

10. The running control apparatus according to claim 7, wherein the target vehicle speed is set by a driver of the vehicle.

11. The running control apparatus according to claim 7, wherein the target vehicle speed is set on a basis of a drive maneuver amount of a driver of the vehicle.

12. The running control apparatus according to claim 7, wherein the target vehicle speed is set on a basis of a gradient of a road surface on which the vehicle runs.

13. A running control method for a vehicle, comprising:
calculating a difference between a target vehicle speed and an actual vehicle speed;
deciding a required driving force or a required driving torque of a driving system of the vehicle on a basis of an integrated value of the difference between the target vehicle speed and the actual vehicle speed such that the actual vehicle speed coincides with the target vehicle speed;
controlling actuation of the driving system on a basis of the required driving force or the required driving torque;
determining whether or not the required driving force or the required driving torque is unrealizable in the control of the driving system due to intervention of additional control; and
imposing a limit on an increase or a decrease in the required driving force or the required driving torque when it is determined that the required driving force or the required driving torque is unrealizable in the control of the driving system,
wherein the required driving force or the required driving torque is maintained, while it is determined that the required driving force or the required driving torque is unrealizable in the control of the driving system, at a value of the required driving force or the required driving torque at a time when it is determined that the required driving torque is unrealizable in the control of the driving system.

14. The running control method according to claim 13, wherein the required driving force or the required driving torque is limited such that a value of the required driving force or the required driving torque becomes closer to an actual driving force or an actual driving torque of the driving system than to a value of the required driving force or the required driving torque that is decided on a basis of an integrated value of the difference between the target vehicle speed and the actual vehicle speed, in imposing the limit on the increase or the decrease in the required driving force or the required driving torque when it is determined that the required driving force or the required driving torque is unrealizable in the control of the driving system.

15. The running control method according to claim 13, wherein the driving system of the vehicle is an engine, the method further comprising:
calculating a target throttle opening degree of the engine on a basis of the required driving force or the required driving torque;
controlling a throttle opening degree of the engine to the target throttle opening degree,
detecting the throttle opening degree of the engine; and
determining that the required driving force or the required driving torque is unrealizable in the control of the driving system, when a difference between a detected value of the throttle opening degree and the target throttle opening degree is outside a predetermined reference range.

16. A running control method for a vehicle, comprising:
calculating a difference between a target vehicle speed and an actual vehicle speed;
deciding a required driving force or a required driving torque of a driving system of the vehicle on a basis of an integrated value of the difference between the target vehicle speed and the actual vehicle speed such that the actual vehicle speed coincides with the target vehicle speed;
controlling actuation of the driving system on a basis of the required driving force or the required driving torque;
determining whether or not the required driving force or the required driving torque is unrealizable in the control of the driving system due to intervention of additional control; and
imposing a limit on an increase or a decrease in the required driving force or the required driving torque when it is determined that the required driving force or the required driving torque is unrealizable in the control of the driving system,
wherein a value of the required driving force or the required driving torque is limited such that a difference between the required driving force or the required driving torque and an actual driving force or an actual driving torque of the driving system at a time, when it is determined that a state of the required driving force or the required driving torque changes from a state that the required driving force or the required driving torque is unrealizable in the control of the driving system into a state that the required driving force or the required driving torque is realizable in the driving system, does not deviate from a predetermined limit range.

17. The running control method according to claim 16, wherein the required driving force or the required driving torque is limited such that a value of the required driving force or the required driving torque becomes closer to an actual driving force or an actual driving torque of the driving system than to a value of the required driving force or the required driving torque that is decided on a basis of an integrated value of the difference between the target vehicle speed and the actual vehicle speed, in imposing the limit on the increase or the decrease in the required driving force or the required driving torque when it is determined that the required driving force or the required driving torque is unrealizable in the control of the driving system.

18. The running control method according to claim 16, wherein the driving system of the vehicle is an engine, the method further comprising:

calculating a target throttle opening degree of the engine on a basis of the required driving force or the required driving torque;

controlling a throttle opening degree of the engine to the target throttle opening degree, detecting the throttle opening degree of the engine; and determining that the required driving force or the required driving torque is unrealizable in the control of the driving system, when a difference between a detected value of the throttle opening degree and the target throttle opening degree is outside a predetermined reference range.

* * * * *